(12) United States Patent
Sugimoto (10) Patent No.: US 10,946,644 B2
(45) Date of Patent: Mar. 16, 2021

(54) PRINTER DEVICE AND METHOD FOR GENERATING APPROPRIATE CONVEYANCE FORCE

(71) Applicant: TOSHIBA TEC KABUSHIKI KAISHA, Tokyo (JP)

(72) Inventor: Kazuaki Sugimoto, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 16/421,541

(22) Filed: May 24, 2019

(65) Prior Publication Data

US 2019/0358950 A1   Nov. 28, 2019

(30) Foreign Application Priority Data

May 24, 2018  (JP) .............................. JP2018-099378

(51) Int. Cl.
  *B41J 2/045*  (2006.01)
  *B23Q 15/12*  (2006.01)
  (Continued)

(52) U.S. Cl.
  CPC .............. *B41J 2/0454* (2013.01); *B23Q 5/14* (2013.01); *B23Q 15/12* (2013.01); *B41J 2/04553* (2013.01); *B41J 11/0095* (2013.01); *B41J 11/42* (2013.01); *G05B 19/19* (2013.01); *B41J 2/22* (2013.01); *B41J 11/0045* (2013.01); *H02P 8/00* (2013.01)

(58) Field of Classification Search
  CPC ........ B41J 3/4075; B41J 11/42; B41J 2/0454; B41J 2/04553; B23Q 15/12
  See application file for complete search history.

(56) References Cited

U.S. PATENT DOCUMENTS 5,023,728 A * 6/1991 Nimura .............. H04N 1/00411
                                              346/104
6,106,176 A * 8/2000 Yanagisawa ........... B41J 3/4075
                                              400/279
(Continued)

OTHER PUBLICATIONS

Chinese Office Action for Chinese Patent Application No. 201910423300.3 dated Sep. 2, 2020.

*Primary Examiner* — John Zimmermann
(74) *Attorney, Agent, or Firm* — Amin, Turocy & Watson, LLP (57) ABSTRACT

A temperature acquisition section (acquisition module) acquires a temperature of an environment in which a printer device is used. A printing condition acquisition section (acquisition module) acquires information relating to printing conditions of the printer device. A conveyance load estimation section (estimation module) estimates a conveyance load when a stepping motor (motor) provided in the printer device conveys a printing paper (print medium) based on the information acquired by the temperature acquisition section and the printing condition acquisition section. A current value setting section (setting module) sets a current value to be applied to the stepping motor based on the conveyance load estimated by the conveyance load estimation section. A motor control section (control module) controls the stepping motor by applying the current value set by the current value setting section to the stepping motor.

20 Claims, 7 Drawing Sheets

(51) Int. Cl.
  *B23Q 5/14* (2006.01)
  *B41J 11/00* (2006.01)
  *G05B 19/19* (2006.01)
  *B41J 11/42* (2006.01)
  *H02P 8/00* (2006.01)
  *B41J 2/22* (2006.01)

(56) References Cited

U.S. PATENT DOCUMENTS

| | | | |
|---|---|---|---|
| 6,172,688 | B1 | 1/2001 | Iwasaki et al. |
| 2004/0183840 | A1* | 9/2004 | Ushigome ............ B41J 3/46 347/2 |
| 2005/0035988 | A1* | 2/2005 | Liao ............ B41J 13/0018 347/16 |
| 2005/0151770 | A1* | 7/2005 | Takeuchi ............ B41J 11/42 347/9 |
| 2006/0214962 | A1* | 9/2006 | Takata ............ B41J 2/04541 347/14 |
| 2012/0082500 | A1* | 4/2012 | Noguchi ............ B41J 11/42 400/582 |
| 2015/0183239 | A1* | 7/2015 | Matsuura ............ B41J 11/42 347/16 |
| 2018/0264861 | A1* | 9/2018 | Ozawa ............ H02P 8/14 |

\* cited by examiner

| TEMPERATURE T | CONVEYANCE LOAD L | CURRENT VALUE I |
|---|---|---|
| LOW (e.g. T < 10 °C) | LARGE | $I_0+\alpha$ |
| | MEDIUM | $I_0+\beta$ |
| | SMALL | $I_0+\gamma$ |
| MEDIUM (e.g. 10 °C ≦ T ≦ 20 °C) | LARGE | $I_0$ |
| | MEDIUM | |
| | SMALL | |
| HIGH (e.g. T > 20 °C) | LARGE | $I_0-\gamma$ |
| | MEDIUM | $I_0-\beta$ |
| | SMALL | $I_0-\alpha$ |

$\alpha > \beta > \gamma > 0$

FIG.7

PRINTER DEVICE AND METHOD FOR GENERATING APPROPRIATE CONVEYANCE FORCE

CROSS-REFERENCE TO RELATED APPLICATION

This application is based upon and claims the benefit of priority from Japanese Patent Application No. P2018-099378, filed on May 24, 2018, the entire contents of which are incorporated herein by reference.

FIELD

Embodiments described herein relate generally to a printer device and a method for generating appropriate conveyance force.

BACKGROUND

A printer device conveys a printing paper at the time of printing. At that time, a conveyance load occurs along with conveyance. The printing paper generally includes paper having different thicknesses, such as a normal paper, an envelope, and a label paper. The printing paper is conveyed at different speeds depending on setting of a printing speed. Furthermore, there is a case in which a conveyance path of the printing paper has a complicatedly curved shape accompanying miniaturization of the printer device. A conveyance load of the printing paper varies according to these various conditions. Furthermore, the conveyance load changes as magnitude of stiffness (elasticity) of the printing paper changes due to environmental temperature. Generally, the stiffness of the paper becomes stronger and the conveyance load becomes larger as the temperature drops.

For these reasons, a printer device is desirable to be capable of generating a conveyance force (torque) according to the conveyance load of the printing paper.

A conventional device is known to estimate a temperature of a motor from an operation state of the motor and an operating environment temperature of the motor to control the operation state of the motor (for example, Japanese Unexamined Patent Application Publication No. 2013-155009 and Japanese Unexamined Patent Application Publication No. 2005-287253).

It is disclosed in Japanese Unexamined Patent Application Publication No. 2013-155009 that a temperature of a motor or a temperature of a peripheral portion of the motor is estimated from an operation state of the motor and a cumulative number of rotation of the motor over a predetermined period of time and an operation mode of the motor is set based on the estimated temperature. It is disclosed in Japanese Unexamined Patent Application Publication No. 2005-287253 that a pause time for stopping the rotation of a motor is set so that a temperature of the motor estimated from an estimated value of a heat generation amount of the motor and the environmental temperature is maintained at a predetermined temperature or less.

However, in both Japanese Unexamined Patent Application Publication No. 2013-155009 and Japanese Unexamined Patent Application Publication No. 2005-287253, a current value to be applied to the motor is controlled to maintain the temperature of the motor within a predetermined temperature range, and the conveyance load of the printing paper is not considered. Therefore, for example, at the time of low temperature at which the conveyance load of the printing paper becomes high, there is a possibility that the conveyance force generated by the motor is insufficient. Then, there is a possibility that the motor is out of step and does not rotate according to a command due to insufficiency of the conveyance force.

DETAILED DESCRIPTION

In accordance with an embodiment, a printer device comprises an acquisition module configured to acquire a temperature of an environment in which the printer device is used and information relating to printing conditions of the printer device; an estimation module configured to estimate a conveyance load when a motor provided in the printer device conveys a print medium which is a printing target based on the information acquired by the acquisition module; a setting module configured to set a current value to be applied to the motor based on the conveyance load of the print medium estimated by the estimation module; and a control module configured to control the motor by applying the current value set by the setting module to the motor.

Several embodiments of a printer device are described in detail with reference to the accompanying drawings. The embodiment described below is merely an embodiment of the printer device, and does not intend to limit a configuration or a specification thereof. The printer device of the present embodiment is an example of a printer device for transferring ink on an ink ribbon onto a printing paper.

(Description of the External Appearance of the Printer Device)

Figure 1:
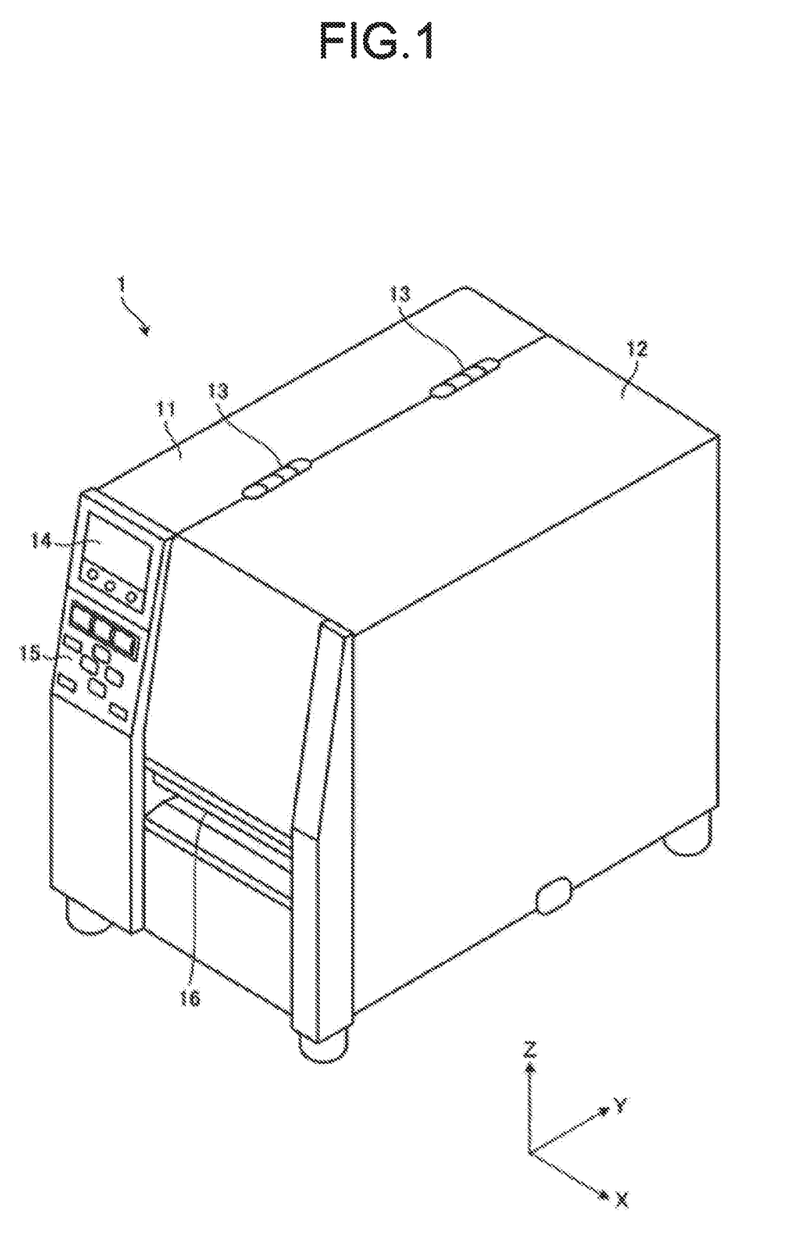
FIG. 1 is a perspective view illustrating an example of an external appearance of a printer device according to an embodiment.

FIG. 1 is a perspective view illustrating an example of an external appearance of a printer device 1 according to the embodiment. As shown in FIG. 1, the printer device 1 includes a left cover 11 that covers a left side (a negative side of an X axis) of the printer device 1 and a right cover 12 that covers a right side (a positive side of the X axis) of the printer device 1. The left cover 11 and the right cover 12 are connected via a hinge 13 formed along a Y axis. The left cover 11 rotates around the hinge 13 to open the inside on the left side of the printer device 1. The right cover 12 rotates around the hinge 13 to open the inside on the right side of the printer device 1.

The left cover 11 has a liquid crystal monitor 14 and an operation switch 15 on a front surface thereof. The liquid crystal monitor 14 displays an operation state of the printer device 1. The operation switch 15 is used for receiving various kinds of settings and operation instructions for the printer device 1.

The right cover 12 has a discharge port 16 on a front surface thereof. A printing paper on which various kinds of information are printed is discharged from the discharge port 16.

(Description of the Internal Structure of the Printer Device)

Figure 2:
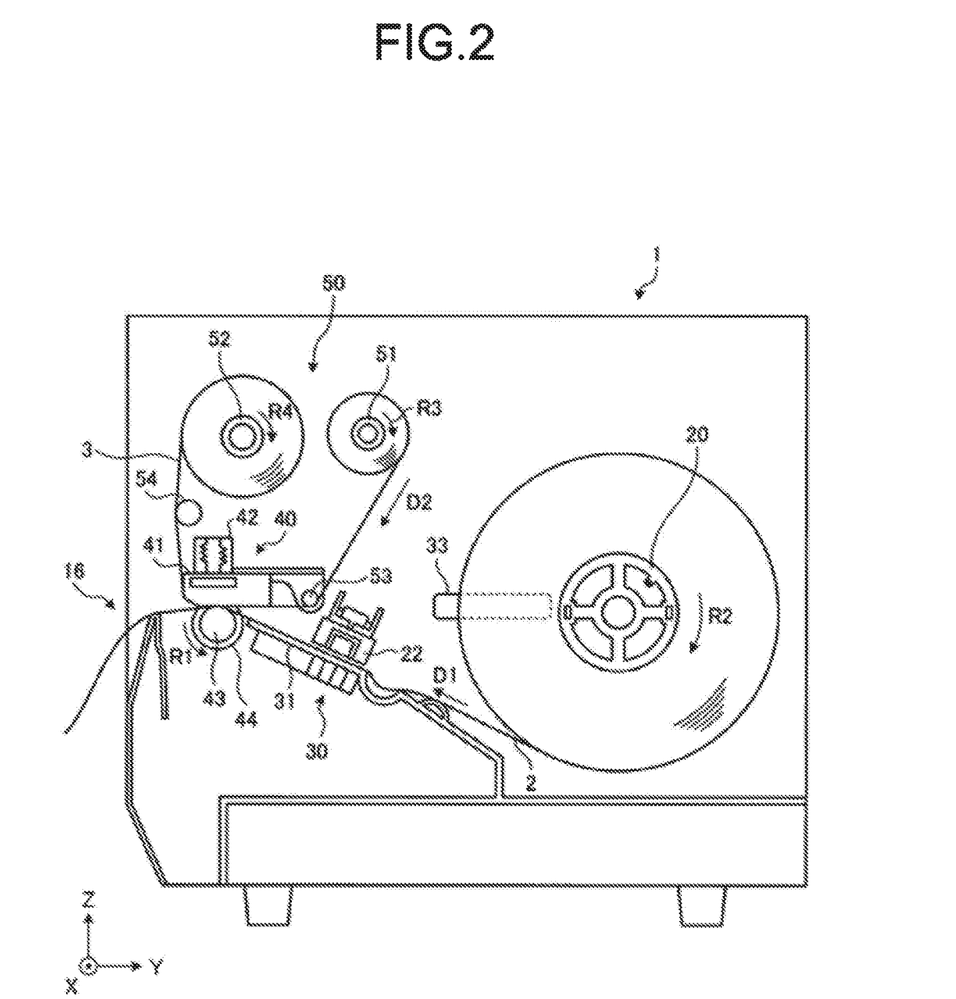
FIG. 2 is a cross-sectional view schematically illustrating an example of an internal structure of the printer device.

FIG. 2 is a cross-sectional view schematically illustrating an example of the internal structure of the printer device 1. More specifically, FIG. 2 is a schematic cross-sectional view as viewed from the positive side of the X axis while the right cover 12 of the printer device 1 is opened. As shown in FIG. 2, the printer device 1 includes a paper holding section 20, a paper conveyance section 30, a printing section 40 and an ink ribbon supply section 50 at the inside of the right cover 12.

The paper holding section 20 is a rotating shaft for holding printing paper 2 wound into a roll shape. The paper holding section 20 can hold any printing paper 2. The printing paper 2 is an example of a print medium. The printing paper 2 may be paper having various surface conditions such as plain paper, matte paper, glossy paper, etc. The printing paper 2 may be paper having various thicknesses such as thick paper, thin paper, etc. The printing paper 2 may be paper in various forms such as a glued label paper in addition to a normal receipt paper. In FIG. 2, the printing paper 2 is set in the printer device 1 in a form in which the printing paper 2 is wound around a roll, but the printing paper 2 may be in a form of fan-folded paper to be applied to the printer device 1 in a state of being folded in a bellows shape. Furthermore, the printing paper 2 may be a film or cloth other than the paper.

A remaining quantity sensor 33 detects that a remaining quantity of the printing paper 2 becomes equal to or less than a threshold value. For example, the remaining quantity sensor 33 is a photo interrupter in which a light emitting element and a light receiving element are arranged to face each other, and detects that the remaining quantity of the printing paper 2 becomes equal to or less than a threshold value by measuring a length of an outer diameter of a roll paper formed by winding the printing paper 2 into a roll shape. The remaining quantity sensor 33 may detect the remaining quantity of the printing paper 2 by a method other than the method of measuring the length of the outer diameter of the roll paper. The remaining quantity sensor 33 may detect the remaining quantity of the printing paper 2 by measuring weight of the roll paper.

The paper conveyance section 30 conveys the printing paper 2 held by the paper holding section 20 towards the discharge port 16, i.e., conveys the printing paper 2 in a direction indicated by an arrow D1 shown in FIG. 2. The paper conveyance section 30 includes a conveyance guide section 31, a temperature sensor 22 and a label sensor (not shown).

The conveyance guide section 31 guides the printing paper 2 at the time of conveying the printing paper 2 towards the discharge port 16.

The temperature sensor 22 is provided in the vicinity of the printing paper 2 being conveyed, and measures a temperature of the environment in which the printer device 1 is placed. The temperature sensor 22 is, for example, a thermistor whose resistance value varies depending on the temperature.

The label sensor (not shown) detects a position of a label when the printing paper 2 is the label paper.

The printing section 40 prints various kinds of information relating to the printing paper 2 being conveyed. The printing section 40 includes a print head 41, a print head pressing section 42 and a platen roller 43.

The print head 41 is, for example, a thermal head for transferring ink on an ink ribbon 3 onto the printing paper 2. The print head 41 is not limited to a thermal head, and may be an impact dot head.

The print head pressing section 42 presses the print head 41 against the ink ribbon 3 during printing. The platen roller 43 is applied with a driving force by a stepping motor 44 to rotate counterclockwise (rotation direction R1). Then, the platen roller 43 and the print head 41 sandwich the printing paper 2 via the ink ribbon 3. With such a configuration, the printing section 40 prints various kinds of information while conveying the printing paper 2. The paper holding section 20 rotates clockwise (rotation direction R2) as the platen roller 43 rotates in the rotation direction R1, and in this way, the printing paper 2 is sent towards the paper conveyance section 30.

The ink ribbon supply section 50 comprises a ribbon holding section 51, a ribbon winding section 52, a first guide shaft 53 and a second guide shaft 54.

The ribbon holding section 51 is a rotating shaft that holds the unused ink ribbon 3 wound in a roll shape and rotates clockwise (rotation direction R3). The ribbon winding section 52 is a rotating shaft that winds the printed ink ribbon 3 drawn out from the ribbon holding section 51 clockwise (rotation direction R4).

The first guide shaft 53 is a rotating shaft for guiding the ink ribbon 3 held by the ribbon holding section 51 to the printing section 40. The second guide shaft 54 is a rotating shaft for guiding the ink ribbon 3 after use in the printing section 40 to the ribbon winding section 52. Specifically, the ink ribbon 3 is conveyed in a direction indicated by an arrow D2 shown in FIG. 2.

The printing paper 2 and the ink ribbon 3 conveyed in this manner are sandwiched by the print head 41 and the platen roller 43 in the printing section 40. Then, the ink on the ink ribbon 3 is transferred onto the printing paper 2 at a position where the heat is applied by the print head 41 to perform printing. Thereafter, the printing paper 2 printed by the printing section 40 is discharged from the discharge port 16.

(Description of the Hardware Structure of the Printer Device)

Figure 3:
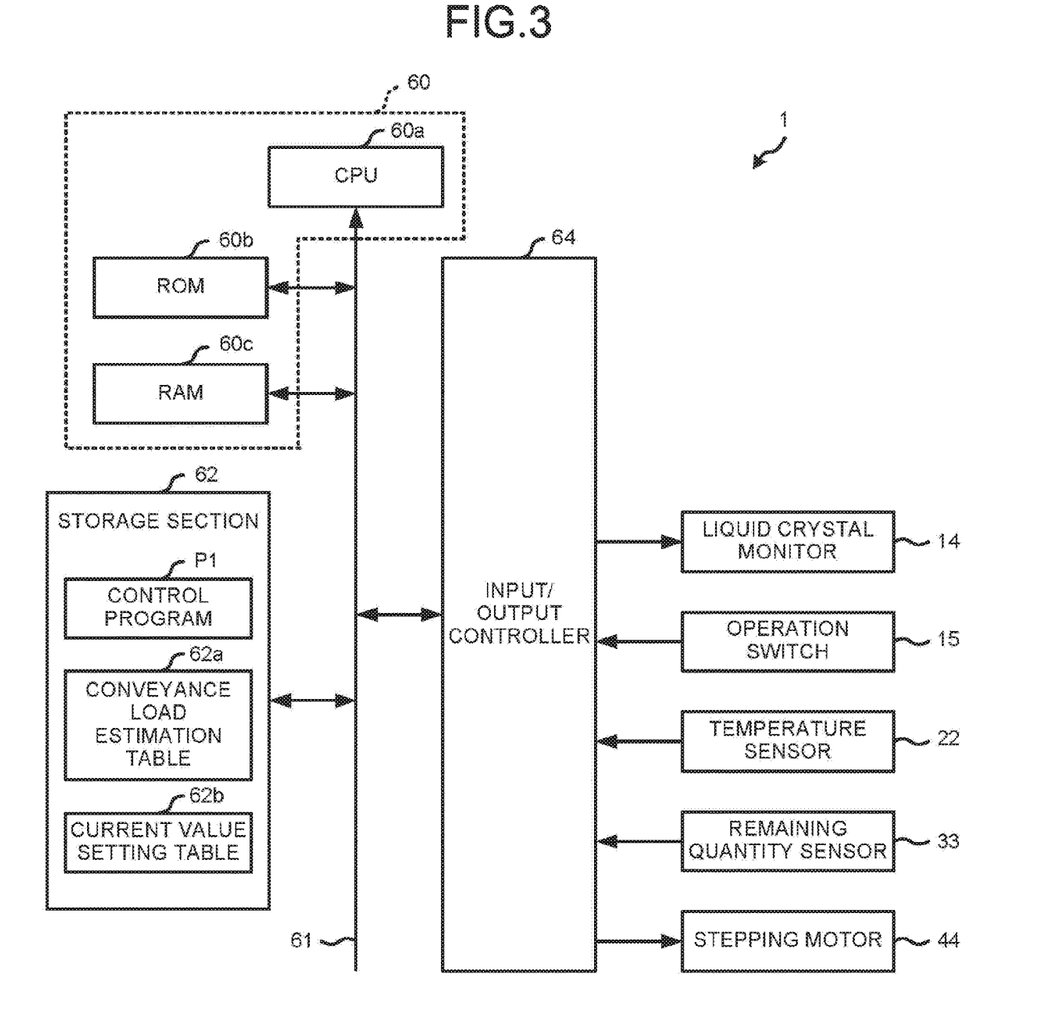
FIG. 3 is a hardware block diagram illustrating an example of a hardware structure of the printer device.

Next, a hardware structure of the printer device 1 is described with reference to FIG. 3. FIG. 3 is a hardware block diagram illustrating an example of the hardware structure of the printer device 1. As shown in FIG. 3, the printer device 1 includes a control section 60, a storage section 62 and an input/output controller 64.

The control section 60 generally has a computer configuration including a CPU (Central Processing Unit) 60a, a ROM (Read Only Memory) 60b and a RAM (Random Access Memory) 60c. The CPU 60a reads out various programs, data files and the like stored in the ROM 60b and the storage section 62 described below, and copies or decompresses them on the RAM 60c. The CPU 60a operates according to various programs, data files, and the like copied or decompressed on the RAM 60c to control the entire printer device 1.

The control section 60 is connected to the storage section 62 and the input/output controller 64 via an internal bus 61, respectively.

The storage section 62 retains stored information even when a power supply thereof is turned off. Specifically, the storage section 62 is an HDD (Hard Disk Drive). The storage section 62 may be a non-volatile memory such as a flash memory instead of the HDD. The storage section 62 stores programs including a control program P1. The control program P1 is a program for performing functions of the printer device 1. The control program P1 may be provided by being incorporated in the ROM 60b in advance. The control program P1 may be provided by being recorded in a computer-readable recording medium such as a CD-ROM (Compact Disc Read-Only Memory), a FD (Flexible Disk), a CD-R (Compact Disk Recordable), a DVD (Digital Versatile Disk) and the like in the form of installable or executable file. Furthermore, the control program P1 may be provided by being stored in a computer connected with a network such as the Internet and downloaded via the network. The control program P1 may be provided or distributed via the network such as the Internet.

The storage section 62 further stores a conveyance load estimation table 62a and a current value setting table 62b.

The conveyance load estimation table 62a is used to decide an estimated value of a conveyance load L of the printing paper 2 based on various setting values when the printer device 1 performs printing and various variable values when the printer device 1 performs printing. Specific contents of the conveyance load estimation table 62a are described below (refer to FIG. 5). The conveyance load estimation table 62a is an example of a table.

The current value setting table 62b stores current values to be applied to the stepping motor 44 according to the estimated conveyance load L. Specific contents of the current value setting table 62b are described later (refer to FIG. 6).

The input/output controller 64 connects the control section 60 to an input/output device that performs various settings and operation control of the printer device 1. Specifically, the input/output controller 64 connects the control section 60 to the liquid crystal monitor 14, the operation switch 15, the temperature sensor 22, the remaining quantity sensor 33 and the stepping motor 44.

The liquid crystal monitor 14 displays a display screen based on an instruction from the control section 60. The operation switch 15 detects operation information of an operator and transmits the operation information to the control section 60.

The temperature sensor 22 measures the temperature of the environment in which the printer device 1 is installed as described above. The remaining quantity sensor 33 detects the remaining quantity of the printing paper 2 as described above.

The stepping motor 44 conveys the printing paper 2 by rotationally driving the platen roller 43. The stepping motor 44 is an example of a motor.

(Description of Functional Components of the Printer Device)

Figure 4:
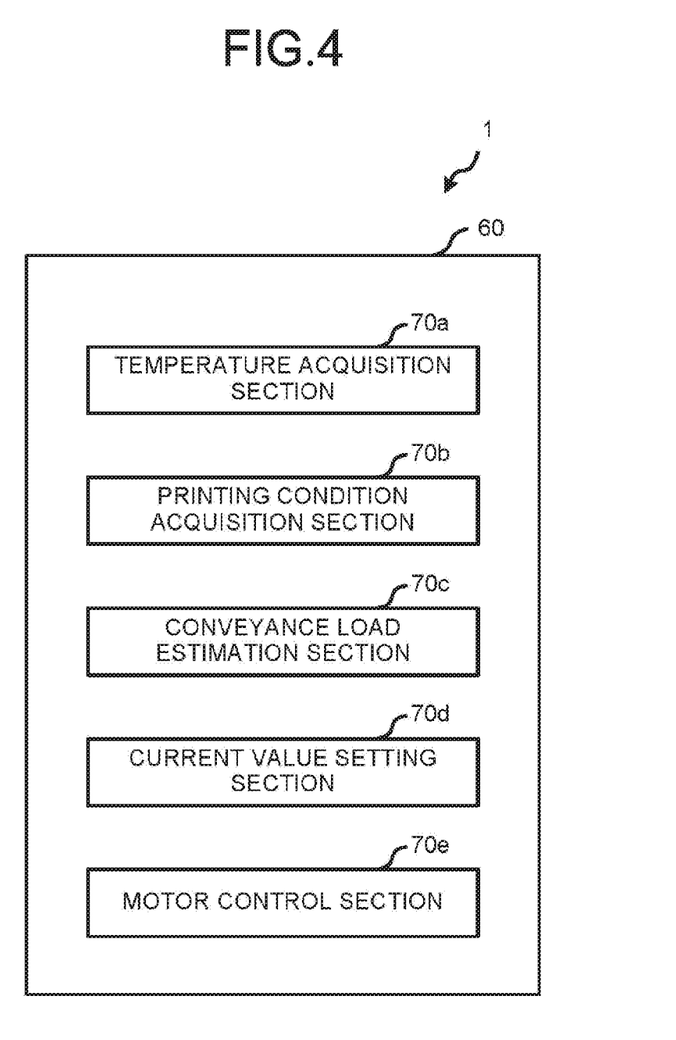
FIG. 4 is a functional block diagram illustrating an example of functional components of the printer device.

Next, the functional components of the printer device 1 are described with reference to FIG. 4. FIG. 4 is a functional block diagram illustrating an example of functional components of the printer device 1.

As shown in FIG. 4, the printer device 1 executes the control program P1 to realize a module configuration including a temperature acquisition section 70a, a printing condition acquisition section 70b, a conveyance load estimation section 70c, a current value setting section 70d, and a motor control section 70e. As actual hardware, the CPU 60a reads out the control program P1 from the storage section 62, copies or decompresses it on the RAM 60c and executes it to generate respective components shown in FIG. 4 in the control section 60.

The temperature acquisition section 70a acquires the temperature of the environment in which the printer device 1 is used. The temperature acquisition section 70a is an example of an acquisition module.

The printing condition acquisition section 70b acquires information relating to printing conditions of the printer device 1. The printing condition acquisition section 70b is an example of an acquisition module.

The conveyance load estimation section 70c estimates the conveyance load L when the printing paper 2 which is a printing target is conveyed by the stepping motor 44 in the printer device 1 based on the information acquired by the temperature acquisition section 70a and the printing condition acquisition section 70b. The conveyance load estimation section 70c is an example of an estimation module.

The current value setting section 70d sets a current value I to be applied to the stepping motor 44 based on the conveyance load L of the printing paper 2 estimated by the conveyance load estimation section 70c. The current value setting section 70d is an example of a setting module.

The motor control section 70e controls the stepping motor 44 by applying the current value I set by the current value setting section 70d to the stepping motor 44. The motor control section 70e is an example of a control module.

(Description of the Method of Estimating Conveyance Load)

Figure 5:
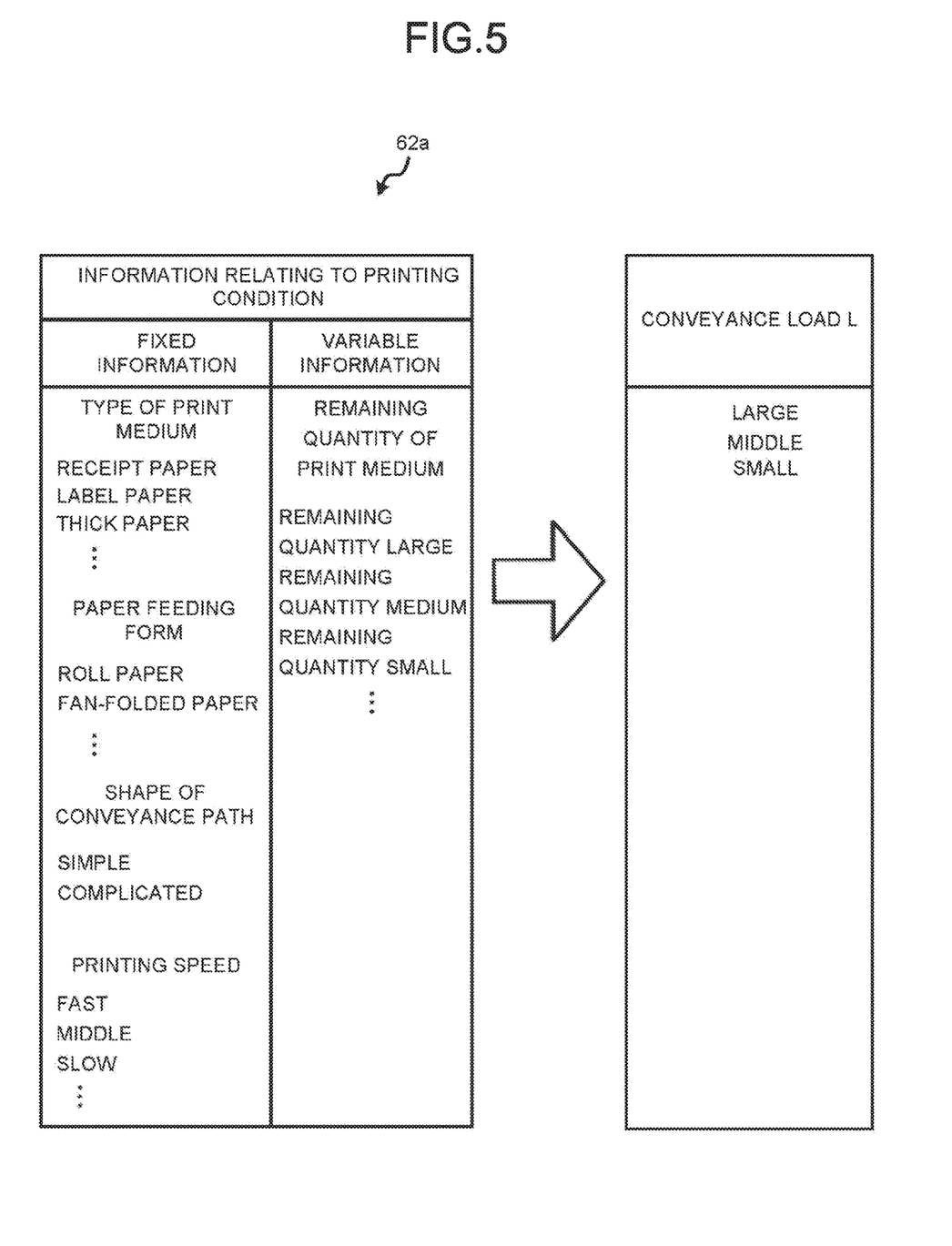
FIG. 5 is a diagram illustrating information necessary to estimate a conveyance load of a printing paper.

Next, a method of estimating the conveyance load L of the printing paper 2 is described with reference to FIG. 5. FIG. 5 is a diagram illustrating information necessary to estimate the conveyance load L of the printing paper 2. Particularly, FIG. 5 is diagram showing a list of information managed in the conveyance load estimation table 62a, which is necessary to estimate the conveyance load L of the printing paper 2.

The conveyance load estimation table 62a is used when the conveyance load L of the printing paper 2 is estimated according to the information relating to the printing conditions acquired by the printing condition acquisition section 70b (acquisition module).

The information relating to the printing conditions acquired by the printing condition acquisition section 70b (acquisition module) includes fixed information which does not change during printing and variable information which changes during printing, as shown in FIG. 5. The fixed information includes the type of the print medium, a paper feeding form, a shape of the conveyance path, a printing speed, and the like. The variable information includes a remaining quantity of the print medium and the like.

There are various types of print media such as a receipt paper, a label paper, a thick paper and the like. Since a frictional force at the time of conveyance of the print medium varies depending on the type of the print medium, the conveyance load L changes accordingly. Generally, the smoother the surface of the print medium such as a glossy paper is, the lower the conveyance load L of the print medium becomes.

The paper feeding form includes a form in which the paper is supplied as roll paper as shown in FIG. 2 and a form (not shown) in which the paper is supplied in a folded manner, i.e. a form of so-called fan-folded paper. Then, the conveyance load L of the print medium differs depending on the paper feeding form. The conveyance load L of the fan-folded paper, which needs to be spread during conveyance, is larger than that of the roll paper.

The shape of the conveyance path may have various forms depending on types of the printer device 1. Then, generally, the more complicated the shape of the conveyance path is, i.e., the larger a degree of change in a conveyance direction in a narrow range is, the larger the conveyance load L of the print medium becomes.

The printing speed is a conveyance speed of the printing paper 2 when the printer device 1 performs printing on the printing paper 2. Generally, the faster the printing speed is, the larger the conveyance load L of the print medium becomes.

All of the fixed information is set before the printer device 1 starts printing. In other words, the type of the print medium, the paper feeding form and the printing speed are appropriately set by a user of the printer device 1 using the operation switch 15 before the printing is started. It is not necessary to set the shape of the conveyance path and the like every time because that information thereof is predetermined for each printer device 1.

The printing condition acquisition section 70b reads out a detection result of the remaining quantity sensor 33 as needed to set the remaining quantity of the print medium.

The conveyance load L of the print medium is estimated based on the information relating to the printing condition acquired in this manner. FIG. 5 only shows a list of the information necessary to estimate the conveyance load L of the printing paper 2. In practice, the conveyance load estimation table 62a stores estimated values of the conveyance load L corresponding to all combinations of information relating to the printing, for example, in a tabular form such as a look-up table.

Specifically, the conveyance load L is estimated based on combinations of the information relating to the printing conditions. At this time, since there are many variations in the combinations of the information relating to the printing conditions, the conveyance load estimation table 62a includes a plurality of tables corresponding to the combinations of information relating to printing conditions, such as "a table used for estimating the conveyance load L when the shape of the conveyance path is complicated and the printing speed is high".

In FIG. 5, the conveyance load L is estimated in three stages: large, medium and small. However, it is not limited thereto, and estimation in plural stages may be performed.

(Description of the Method of Setting the Current Value)

Figure 6:
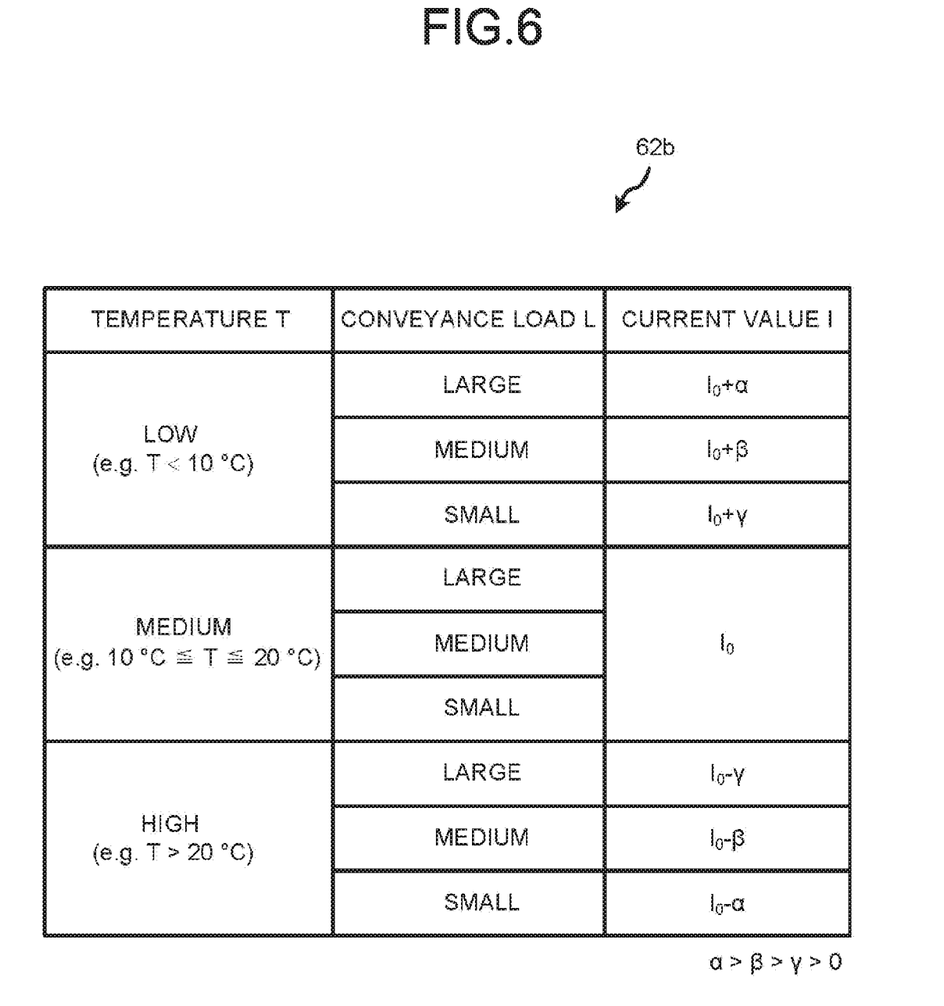
FIG. 6 is a diagram illustrating an example of a method of setting a current value to be applied to a stepping motor based on the estimated conveyance load of the printing paper.

Next, a method of setting a current value I to be applied to the stepping motor 44 is described with reference to FIG. 6. FIG. 6 is a diagram illustrating an example of the method of setting the current value I to be applied to the stepping motor 44 based on the estimated conveyance load L of the printing paper 2.

The current value setting section 70d sets the current value I to be applied to the stepping motor 44 based on the current value setting table 62b shown in FIG. 6.

The current value setting section 70d sets the current value I according to a temperature T of the environment in which the printer device 1 is installed, which is measured by the temperature sensor 22. Then, at the time of setting the current value I, the current value setting section 70d further takes into consideration the conveyance load L estimated based on the conveyance load estimation table 62a.

Specifically, the current value setting section 70d sets the current value I corresponding to the magnitude of the conveyance load L for each temperature range depending on whether the temperature T is low, medium or high, for example.

Specifically, when the temperature T is in a medium temperature range (for example, 10° C.≤T≤20° C.), the current value setting section 70d sets that I=Io regardless of the magnitude of the conveyance load L.

When the temperature T is in a low temperature range (for example, T<10° C.), the current value setting section 70d sets the current value I to a larger value. Furthermore, according to the magnitude of the conveyance load L, the current value I is set to be larger as the conveyance load L is large.

Specifically, by setting positive constants $\alpha$, $\beta$ and $\gamma$ ($\alpha>\beta>\gamma>0$), the current value setting section 70d sets that I=Io+$\alpha$ if it is estimated that the conveyance load L is large. If it is estimated that the conveyance load L is small, the current value setting section 70d sets that I=Io+$\gamma$. Then, if it is estimated that the conveyance load L is medium, the current value setting section 70d sets that I=Io+$\beta$.

The current value setting section 70d sets the current value I to a smaller value when the temperature T is in the high temperature range (for example, T>20° C.). Furthermore, according to the magnitude of the conveyance load L, the current value I is set to a smaller value as the conveyance load L is small.

Specifically, by using the positive constants $\alpha$, $\beta$ and $\gamma$ described above, the current value setting section 70d sets that I=Io−$\gamma$ if it is estimated that the conveyance load L is large. If it is estimated that the conveyance load L is small, the current value setting section 70d sets that I=Io−$\alpha$. Then, if it is estimated that the conveyance load L is medium, the current value setting section 70d sets that I=Io−$\beta$.

The setting of the current value I using the positive constants $\alpha$, $\beta$ and $\gamma$ is merely an example, and the current value I may be set in more stages.

In order to prevent the stepping motor 44 from being out of step at least when the temperature T is low, the current value setting section 70d may set that I=Io regardless of the magnitude of the conveyance load L when the temperature T exceeds a preset temperature threshold value, or may set the current value I to be a value larger than Io when the temperature T falls below the preset temperature threshold value.

Here, as the current value I to be applied to the stepping motor 44 is large, the temperature of the stepping motor 44 is increased. Then, as the temperature of the stepping motor 44 is increased, a problem such as a predetermined torque cannot be obtained due to heat loss of the motor occurs. Therefore, the current value I set according to FIG. 6 is set within a range that does not exceed a predetermined upper limit value on condition that the temperature of the stepping motor 44 does not exceed a predetermined temperature even when the printer device 1 is used continuously for a predetermined period of time or longer.

(Description of a Flow of Processing Performed by the Printer Device)

Figure 7:
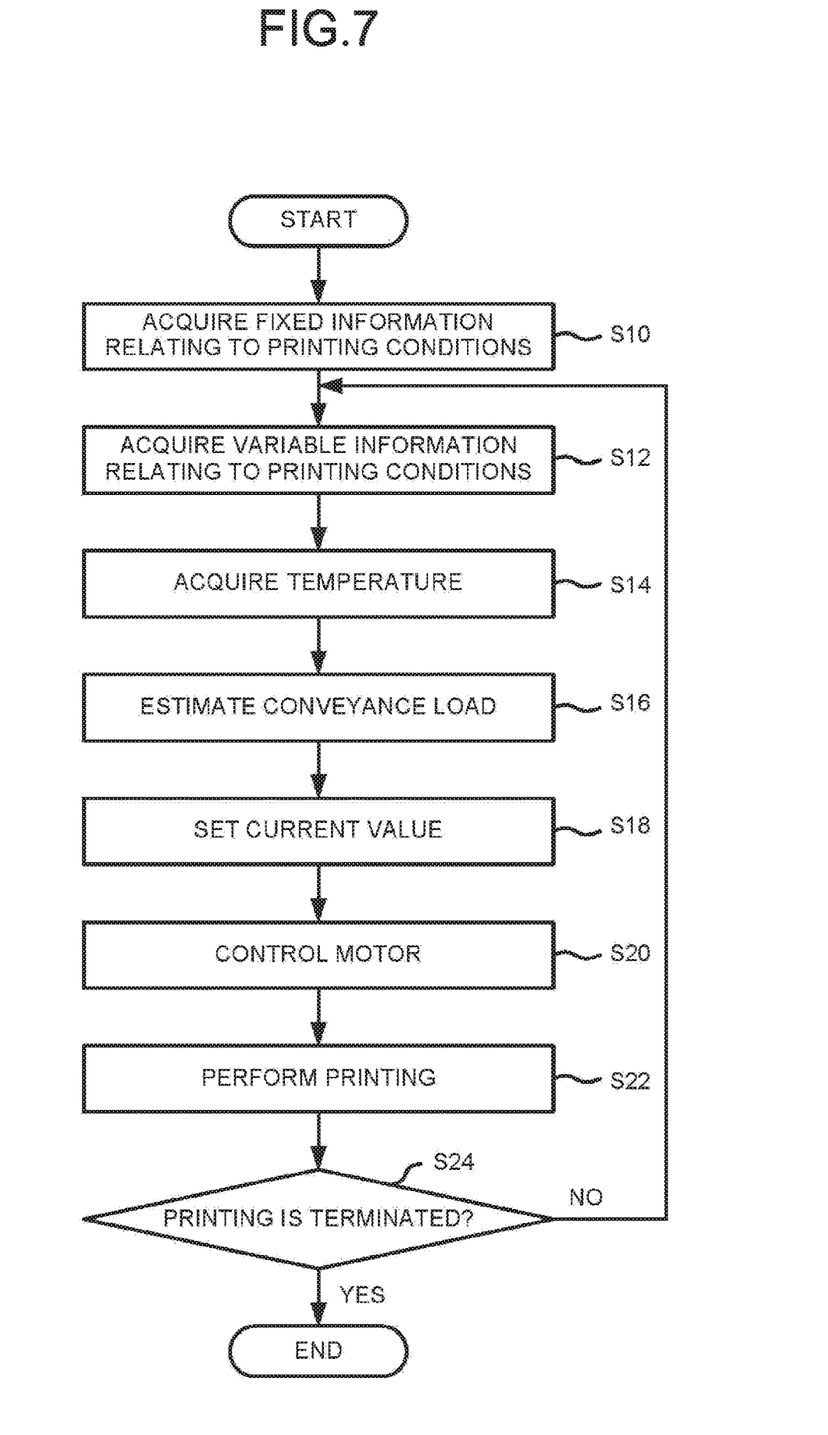
FIG. 7 is a flowchart depicting an example of procedures of a processing performed by the printer device.

Next, the flow of the processing performed by the printer device 1 is described with reference to FIG. 7. FIG. 7 is a flowchart depicting an example of the flow of the processing performed by the printer device 1.

First, the printing condition acquisition section 70b acquires the fixed information relating to the printing conditions (Act S10). The fixed information relating to the printing conditions includes the above-described type of the print medium, the paper feeding form, the shape of the conveyance path, the printing speed, and the like, which do not change until the printing is completed.

Next, the printing condition acquisition section 70b acquires the variable information relating to the printing conditions (Act S12). The variable information relating to the printing conditions includes the above-described paper remaining quantity and the like, of which values change during printing.

Subsequently, the temperature acquisition section 70a acquires the temperature T of the environment in which the printer device 1 is used from the temperature sensor 22 (Act S14).

The conveyance load estimation section 70c estimates the conveyance load L of the printing paper 2 (Act S16).

Subsequently, the current value setting section 70d sets the current value I to be applied to the stepping motor 44 (Act S18).

The motor control section 70e controls the stepping motor 44 by applying the current value I set by the current value setting section 70d to the stepping motor 44 (Act S20).

The printing section 40 of the printer device 1 prints predetermined information on the printing paper 2 (Act S22).

The motor control section 70e determines whether the printing is terminated (Act S24). If it is determined that the printing is terminated (Yes in Act S24), the printer device 1 terminates the processing shown in FIG. 7. On the other hand, if it is determined that the printing is not terminated (No in Act S24), the flow returns to the processing in Act S12 to continue the printing.

As described above, in the printer device 1 of the embodiment, the temperature acquisition section 70a (acquisition module) acquires the temperature T of the environment in which the printer device 1 is used, and the printing condition acquisition section 70b (acquisition module) acquires the information relating to the printing conditions of the printer device 1. Then, based on the information acquired by the temperature acquisition section 70a and the printing condition acquisition section 70b, the conveyance load estimation section 70c (estimation module) estimates the conveyance load L when the stepping motor 44 (motor) of the printer device 1 conveys the printing paper 2 (print medium). Furthermore, the current value setting section 70d (setting module) sets the current value I to be applied to the stepping motor 44 based on the conveyance load L estimated by the conveyance load estimation section 70c, and the motor control section 70e (control module) controls the stepping motor 44 by applying the current value I set by the current value setting section 70d to the stepping motor 44. Therefore, it is possible to enable the stepping motor 44 to generate an appropriate conveyance force corresponding to the conveyance load L of the printing paper 2 (print medium).

In the printer device 1 of the embodiment, the printing condition acquisition section 70b (acquisition module) acquires at least one of the type of the print medium, the paper feeding form, the shape of the conveyance path, the printing speed and the remaining quantity of the print medium as the information relating to the printing conditions. Therefore, the conveyance load L of the printing paper 2 can be estimated based on the information relating to the printing conditions.

In the printer device 1 of the embodiment, the conveyance load estimation section 70c (estimation module) estimates the conveyance load L of the printing paper 2 by referring to the previously created conveyance load estimation table 62a (table) based on the information relating to the printing conditions acquired by the printing condition acquisition section 70b, wherein the conveyance load estimation table 62a stores the conveyance load L of the printing paper 2 (print medium) and the information relating to the printing conditions in an associated manner. Therefore, the conveyance load L of the printing paper 2 can be easily estimated.

In the printer device 1 of the embodiment, the current value setting section 70d (setting module) sets the current value I to be applied to the stepping motor 44 (motor) to a higher value in the case in which the temperature of the environment acquired by the temperature acquisition section 70a (acquisition module) is lower than a predetermined temperature and the conveyance load L of the printing paper 2 (print medium) estimated by the conveyance load estimation section 70c (estimation module) is higher than a predetermined value, as compared with the case in which the conveyance load L is lower than the predetermined value. Therefore, it is possible to set a current value I for generating a conveyance force sufficient to convey the printing paper 2 according to the conveyance load L of the printing paper 2.

In the printer device 1 of the embodiment, the current value setting section 70d (setting module) sets the current value I to be applied to the stepping motor 44 (motor) within the range below the predetermined upper limit value. Therefore, the temperature of the stepping motor 44 can be prevented from exceeding the predetermined temperature.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printer device, comprising:
   an acquisition module configured to acquire a temperature of an environment in which the printer device is used and information relating to printing conditions of the printer device, wherein the printing conditions comprise fixed information representing conditions that do not change during printing and variable information representing conditions that change during printing;
   an estimation module configured to estimate a conveyance load when a motor provided in the printer device conveys a print medium based on the information acquired by the acquisition module;
   a setting module configured to set a current value to be applied to the motor based on the conveyance load of the print medium estimated by the estimation module; and
   a control module configured to control the motor by applying the current value set by the setting module to the motor,
   wherein the acquisition module, at a start of printing, acquires the temperature of the environment and the printing conditions, and
   wherein the acquisition module, during the printing, acquires the temperature of the environment and the variable information.

2. The printer device according to claim 1, wherein the acquisition module, at the start of the printing, acquires the temperature of the environment and at least one of a type of the print medium, a paper feeding form, a shape of a conveyance path, a printing speed, and a remaining quantity of the print medium as the information relating to the printing conditions, and further the acquisition module, during the printing, acquires the temperature of the environment and the remaining quantity of the print medium.

3. The printer device according to claim 1, wherein
the estimation module estimates the conveyance load of the print medium by referring to a previously created table in which the conveyance load of the print medium and the information relating to the printing conditions are stored in an associated manner based on the information relating to the printing conditions acquired by the acquisition module.

4. The printer device according to claim 2, wherein
the estimation module estimates the conveyance load of the print medium by referring to a previously created table in which the conveyance load of the print medium and the information relating to the printing conditions are stored in an associated manner based on the information relating to the printing conditions acquired by the acquisition module.

5. The printer device according to claim 1, wherein
the setting module sets the current value to be applied to the motor to a higher value in a case in which the temperature of the environment acquired by the acquisition module is lower than a predetermined temperature and the conveyance load of the print medium estimated by the estimation module is higher than a predetermined conveyance load, as compared with a case in which the conveyance load is lower than the predetermined conveyance load.

6. The printer device according to claim 1, wherein
the setting module sets the current value to be applied to the motor to a lower value in a case in which the temperature of the environment acquired by the acquisition module is higher than a predetermined temperature and the conveyance load of the print medium estimated by the estimation module is lower than a predetermined conveyance load, as compared with a case in which the conveyance load is higher than the predetermined conveyance load.

7. The printer device according to claim 1, wherein
the setting module sets the current value to be applied to the motor to a higher value in a case in which the temperature of the environment acquired by the acquisition module is lower than a predetermined temperature.

8. The printer device according to claim 1, wherein
the setting module sets the current value to be applied to the motor to a higher value in a case in which the conveyance load of the print medium estimated by the estimation module is higher than a predetermined conveyance load, as compared with a case in which the conveyance load is lower than the predetermined conveyance load.

9. The printer device according to claim 1, wherein
the setting module sets the current value to be applied to the motor within a range below a predetermined upper limit value.

10. The printer device according to claim 1, wherein
the acquisition module acquires a type of the print medium as the information relating to the printing conditions.

11. A method for generating an appropriate conveyance force by a printer device, comprising:
acquiring a temperature of an environment in which the printer device is used and information relating to printing conditions of the printer device, wherein the printing conditions comprise fixed information representing conditions that do not change during printing and variable information representing conditions that change during printing;
estimating a conveyance load when a motor provided in the printer device conveys a print medium based on the acquired information;
setting a current value to be applied to the motor based on the estimated conveyance load of the print medium; and
controlling the motor by applying the set current value to the motor;
wherein the acquiring further comprises, at a start of printing, acquiring the temperature of the environment and the printing conditions, and during the printing, acquiring the temperature of the environment and the variable information.

12. The method according to claim 11, wherein
acquiring involves acquiring, at the start of the printing, the temperature of the environment and at least one of a type of the print medium, a paper feeding form, a shape of a conveyance path, a printing speed, and a remaining quantity of the print medium as the information relating to the printing conditions, and the acquiring further comprises acquiring, during the printing, the temperature of the environment and the remaining quantity of the print medium.

13. The method according to claim 11, further comprising:
estimating the conveyance load of the print medium by referring to a previously created table in which the conveyance load of the print medium and the information relating to the printing conditions are stored in an associated manner based on the information relating to the printing conditions acquired by the acquiring.

14. The method according to claim 12, further comprising:
estimating the conveyance load of the print medium by referring to a previously created table in which the conveyance load of the print medium and the information relating to the printing conditions are stored in an associated manner based on the information relating to the printing conditions acquired by the acquiring.

15. The method according to claim 11, further comprising:
setting the current value to be applied to the motor to a higher value in a case in which the temperature of the environment acquired by the acquiring is lower than a predetermined temperature and the conveyance load of the print medium estimated by the estimating is higher than a predetermined conveyance load, as compared with a case in which the conveyance load is lower than the predetermined conveyance load.

16. The method according to claim 11, further comprising:
setting the current value to be applied to the motor to a lower value in a case in which the temperature of the environment acquired by the acquiring is higher than a predetermined temperature and the conveyance load of the print medium estimated by the estimating is lower than a predetermined conveyance load, as compared with a case in which the conveyance load is higher than the predetermined conveyance load.

17. The method according to claim 11, further comprising:
setting the current value to be applied to the motor to a higher value in a case in which the temperature of the environment acquired by the acquiring is lower than a predetermined temperature.

18. The method according to claim 11, further comprising:

setting the current value to be applied to the motor to a higher value in a case in which the conveyance load of the print medium estimated by the estimating is higher than a predetermined conveyance load, as compared with a case in which the conveyance load is lower than the predetermined conveyance load.

19. The method according to claim 11, further comprising:

setting the current value to be applied to the motor within a range below a predetermined upper limit value.

20. The method according to claim 11, wherein acquiring involves acquiring a type of the print medium as the information relating to the printing conditions.

\* \* \* \* \*